(12) United States Patent
Noji et al.

(10) Patent No.: US 7,593,737 B2
(45) Date of Patent: Sep. 22, 2009

(54) TRANSPORTATION MANAGEMENT SYSTEM, TRANSPORTATION MANAGEMENT METHOD, COMMUNICATION SHEET, AND COMMUNICATION ANTENNA

(75) Inventors: Tetsuo Noji, Shizuoka (JP); Yoshihiro Sugiyama, Shizuoka (JP); Wakoh Hamada, Shizuoka (JP); Hideki Kawashima, Shizuoka (JP); Hideo Sakurai, Shizuoka (JP); Atsushi Kutami, Shizuoka (JP); Tatsuro Saitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 555 days.

(21) Appl. No.: 11/217,403

(22) Filed: Sep. 2, 2005

(65) Prior Publication Data

US 2006/0059193 A1    Mar. 16, 2006

(30) Foreign Application Priority Data

Sep. 8, 2004    (JP)    ............................. 2004-261012

(51) Int. Cl.
*H04W 24/00*    (2006.01)
(52) U.S. Cl. .................. 455/456.1; 455/41.2; 455/41.3; 455/42; 455/412.1; 340/572.1; 340/571; 340/568.1
(58) Field of Classification Search .............. 455/456.1, 455/41.2, 41.3, 42, 412.1; 340/572.1, 571, 340/568.1
See application file for complete search history.

(56) References Cited

U.S. PATENT DOCUMENTS

| | | | | |
|---|---|---|---|---|
| 4,023,167 A | * | 5/1977 | Wahlstrom | .................... 342/42 |
| 5,381,137 A | * | 1/1995 | Ghaem et al. | ............ 340/572.5 |
| 5,903,548 A | * | 5/1999 | Delamater | ................... 370/310 |
| 5,987,307 A | * | 11/1999 | Buskirk et al. | ................. 455/73 |
| 6,094,133 A | * | 7/2000 | Shimamura et al. | ......... 340/505 |
| 6,718,158 B1 | * | 4/2004 | Suonvieri | ....................... 455/9 |
| 2002/0089434 A1 | * | 7/2002 | Ghazarian | .................... 340/988 |
| 2003/0112126 A1 | * | 6/2003 | Kubler et al. | ............. 340/10.33 |
| 2005/0278088 A1 | * | 12/2005 | Thorner | ........................ 701/28 |

FOREIGN PATENT DOCUMENTS

| | | |
|---|---|---|
| JP | 11-161885 | 6/1999 |
| JP | 2004-295401 | 10/2004 |
| JP | 2004-295402 | 10/2004 |

* cited by examiner

*Primary Examiner*—Joseph H Feild
*Assistant Examiner*—Huy D Nguyen
(74) *Attorney, Agent, or Firm*—Oblon, Spivak, McClelland, Maier & Neustadt, L.L.P.

(57) ABSTRACT

A disclosed transportation management system includes a database including operational information and operator information that correspond to a target object, a transmission control part for transmitting a transmission radio wave to an information storage medium attached to the target object and a reception control part for receiving a reception radio wave, including identification information of the target object, from the information storage medium, a transport information obtaining part for obtaining transport information of the target object, an operational information retrieving part for retrieving the operational information from the database in accordance with the identification information of the target object, an information comparing part for comparing the transport information of the target object and the operational information, a notification information generating part for generating notification information indicative of the result of the comparison; and a notification information transmitting part for transmitting the notification information in accordance with the operator information.

11 Claims, 9 Drawing Sheets

| OPERATIONAL INFORMATION | OPERATION | OPERATION ID NUMBER | PRIOR OPERATION | SUBSEQUENT OPERATION | DISPLAY AREA 1 | DISPLAY AREA 2 | FORM INFORMATION | INSTRUCTION INFORMATION |
|---|---|---|---|---|---|---|---|---|
| OPERATION 1 | A OPERATION | a001 | | b001 | NOTIFICATION INFORMATION | DATE, OPERATOR | REGISTRATION FORM | YES |
| OPERATION 2 | B OPERATION | b001 | a001 | b001 | NOTIFICATION INFORMATION | DATE, OPERATOR | PROCESS FORM | YES |
| OPERATION 3 | C OPERATION | c001 | b001 | | NOTIFICATION INFORMATION | DATE, OPERATOR | SHIPPING FORM | YES |
| .. | .. | .. | .. | .. | .. | .. | .. | .. |

| NOTIFICATION DESTINATION | METHOD OF COMMUNICATION | RELATED OPERATION | COMBINING OPERATION | ... |
|---|---|---|---|---|
| OPERATOR | E-MAIL | YES | NO | ... |
| MANAGER | TELEPHONE | YES | YES | ... |
| DELIVERY DESTINATION | FAX | NO | YES | ... |
| .. | .. | .. | .. | .. |

FIG.8B

| DISPLAY AREA | REWRITABLE | OPERATION 1 | | | OPERATION 2 | | | OPERATION 3 | | | ... | LAYOUT INFORMATION | PRIORITY |
|---|---|---|---|---|---|---|---|---|---|---|---|---|---|
| | | DISPLAY INFORMATION | DISPLAY AREA | | DISPLAY INFORMATION | DISPLAY AREA | | DISPLAY INFORMATION | DISPLAY AREA | | | | |
| AREA 1 | YES | NOTIFICATION INFORMATION | , | .. | NOTIFICATION INFORMATION | , | .. | NOTIFICATION INFORMATION | , | .. | ... | | 1 |
| AREA 2 | NO | NOTIFICATION INFORMATION | , | .. | NOTIFICATION INFORMATION | , | .. | NOTIFICATION INFORMATION | , | .. | ... | | 2 |
| .. | .. | .. | .. | | .. | .. | | .. | .. | | ... | | .. |
| AREA n | NO | CODE DATA | , | .. | CODE DATA | , | .. | CODE DATA | , | .. | ... | | n |
| .. | .. | .. | .. | | .. | .. | | .. | .. | | ... | | .. |

TRANSPORTATION MANAGEMENT SYSTEM, TRANSPORTATION MANAGEMENT METHOD, COMMUNICATION SHEET, AND COMMUNICATION ANTENNA

BACKGROUND OF THE INVENTION

1. Field of the Invention

The present invention relates to a transportation management system, a transportation management method, a communication sheet, and a communication antenna, and more particularly to a transportation management system, a transportation management method, a communication sheet, and a communication antenna for achieving reliable reading of and/or writing on an information storage medium attached to one or more transported objects.

2. Description of the Related Art

Conventionally, in a case of managing objects such as cargo being transported in and out through an entrance at a prescribed facility (e.g. factory), an operator at the facility identifies the transported object by looking for predetermined code information attached to the object and applying a hand scanner to a predetermined portion of the object. As another identification management system, the transported object may also be identified by installing a gate type identification management system (gate type identification management apparatus) at the entrance of the facility (e.g. factory). The identification management system (gate type identification management apparatus) may include, for example, a hand scanner, a communication apparatus, an antenna, and an identification apparatus. With the gate type identification management system (gate type identification management apparatus), a radio wave(s) is transmitted from the antenna of the communication apparatus to an information storage medium (including a resonant medium) attached to the transported object. In response to the transmitted radio wave(s), the information storage medium transmits a radio wave(s) to the communication apparatus; thereby allowing the identification management system (gate type identification management apparatus) to identify and manage the transported object (For example, see Japanese Laid-Open Patent Application No. 11-161885).

However, with the conventional identification management system, the operator using the hand scanner is required to look for the information storage medium attached to the object and apply the hand scanner to a correct portion of the information storage medium to which a read sensor is provided. This identification procedure adversely affected operational efficiency in a case, for example, where several objects are transported to the entrance at the same time.

Furthermore, in the conventional identification management system (identification management apparatus), the location of the information storage medium attached to the transported object and the area for transmitting/receiving radio waves with respect to the communication apparatus of the identification management system are difficult to identify, for example, when several objects (e.g. cargo) of various shapes are loaded onto a carrier (e.g. transportation carriage) or when the objects are transported as a bundle. This causes difficulty in the identification of the transported objects and adversely affects operations following this identification procedure.

Furthermore, even when the information storage medium cannot be identified due to malfunction (e.g. disconnection) of the antenna or the communication apparatus, the operator handling the transport of the cargo is unable to realize the operating state of the apparatuses for identifying the information storage medium. This prevents precise transportation of the cargo. Furthermore, in a case where the malfunctioned antenna and the communication apparatus are both included in a single apparatus, a large amount of time would be required for replacing the malfunctioned component, or in some cases the replacement or repair of the entire apparatus may be necessary. The cost for such replacement or repair is expensive. Furthermore, such replacement can neither be conducted quickly nor easily.

SUMMARY OF THE INVENTION

It is a general object of the present invention to provide a transportation management system, a transportation management method, a communication sheet, and a communication antenna that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a transportation management system, a transportation management method, a communication sheet, and a communication antenna particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a transportation management system for managing transportation of a target object with an attached information storage medium, the transportation management system including: a database including operational information and operator information that correspond to the target object; a communication apparatus including a transmission control part for transmitting a transmission radio wave to the information storage medium attached to the target object and a reception control part for receiving a reception radio wave, including identification information of the target object, from the information storage medium in response to the transmitted transmission radio wave; a transport information obtaining part for obtaining transport information of the target object when the target object is transported to a predetermined area; an operational information retrieving part for retrieving the operational information corresponding to the target object from the database in accordance with the identification information of the target object; an information comparing part for comparing the transport information of the target object and the operational information corresponding to the target object; a notification information generating part for generating notification information indicative of the result of the comparison; and a notification information transmitting part for transmitting the notification information to a predetermined destination in accordance with the operator information corresponding to the target object.

In the transportation management system according to an embodiment of the present invention, the communication apparatus may be detachably attached to a sheet member, wherein the sheet member may be configured to sway when the target object contacts the sheet member.

In the transportation management system according to an embodiment of the present invention, the sheet member may be shaped as a split curtain, wherein the sheet member may include a pouch part for removably installing the communication apparatus therein.

In the transportation management system according to an embodiment of the present invention, the communication apparatus may further include an output part for determining the state of the transmission radio wave and the reception radio wave and outputting the result of the determination.

In the transportation management system according to an embodiment of the present invention, the database may further include setting information corresponding to the target object and the transportation of the target object, wherein the communication apparatus may further include a modulating part for modulating the frequency of the transmission radio wave in accordance with the setting information, wherein the transmission radio wave with the modulated frequency may be transmitted at a predetermined timing by the transmission control part.

Furthermore, the present invention provides a transportation management system for managing transportation of a target object with an attached information storage medium including a rewritable display area that displays visible information, the transportation management system including: a database including operational information and operator information that correspond to the target object; a communication apparatus including a transmission control part for transmitting a transmission radio wave to the information storage medium attached to the target object and a reception control part for receiving a reception radio wave, including identification information of the target object, from the information storage medium in response to the transmitted transmission radio wave; a transport information obtaining part for obtaining transport information of the target object when the target object is transported to a predetermined area; an operational information retrieving part for retrieving the operational information corresponding to the target object from the database in accordance with the identification information of the target object; an information comparing part for comparing the transport information of the target object and the operational information corresponding to the target object; a notification information generating part for generating notification information indicative of the result of the comparison; a notification information transmitting part for transmitting the notification information; a rewriting apparatus for rewriting the visible information displayed in the rewritable display area of the information storage medium; and a computing apparatus for instructing the rewriting apparatus that the visible information be displayed in the rewritable display area of the information storage medium in accordance with the notification information transmitted from the notification information transmitting part.

Furthermore, the present invention provides a transportation management method for managing transportation of a target object with an attached information storage medium, the transportation management method including the steps of: transmitting a transmission radio wave to the information storage medium attached to the target object; receiving a reception radio wave, including identification information of the target object, from the information storage medium in response to the transmitted transmission radio wave; obtaining transport information of the target object when the target object is transported to a predetermined area; retrieving operational information corresponding to the target object in accordance with the identification information of the target object; comparing the transport information of the target object and the operational information corresponding to the target object; generating notification information indicative of the result of the comparison; retrieving operator information corresponding to the target object; and transmitting the notification information to a predetermined destination in accordance with the operator information corresponding to the target object.

In the transportation management method according to an embodiment of the present invention, the transportation management method may further include the steps of: determining the state of the transmission radio wave and the reception radio wave; and outputting the result of the determination.

In the transportation management method according to an embodiment of the present invention, the transportation management method may further include the steps of: retrieving setting information corresponding to the target object and the transportation of the target object; and modulating the frequency of the transmission radio wave in accordance with the setting information; wherein the transmission radio wave with the modulated frequency is transmitted at a predetermined timing by the transmission control part.

Furthermore, the present invention provides a communication sheet including: the communication apparatus and the sheet member according to the embodiment of the present invention.

Furthermore, the present invention provides a communication antenna including a terminal part for transmitting and receiving radio waves for communicating with an information storage medium attached to a target object.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to FIGS. 1-8.

Figure 1:
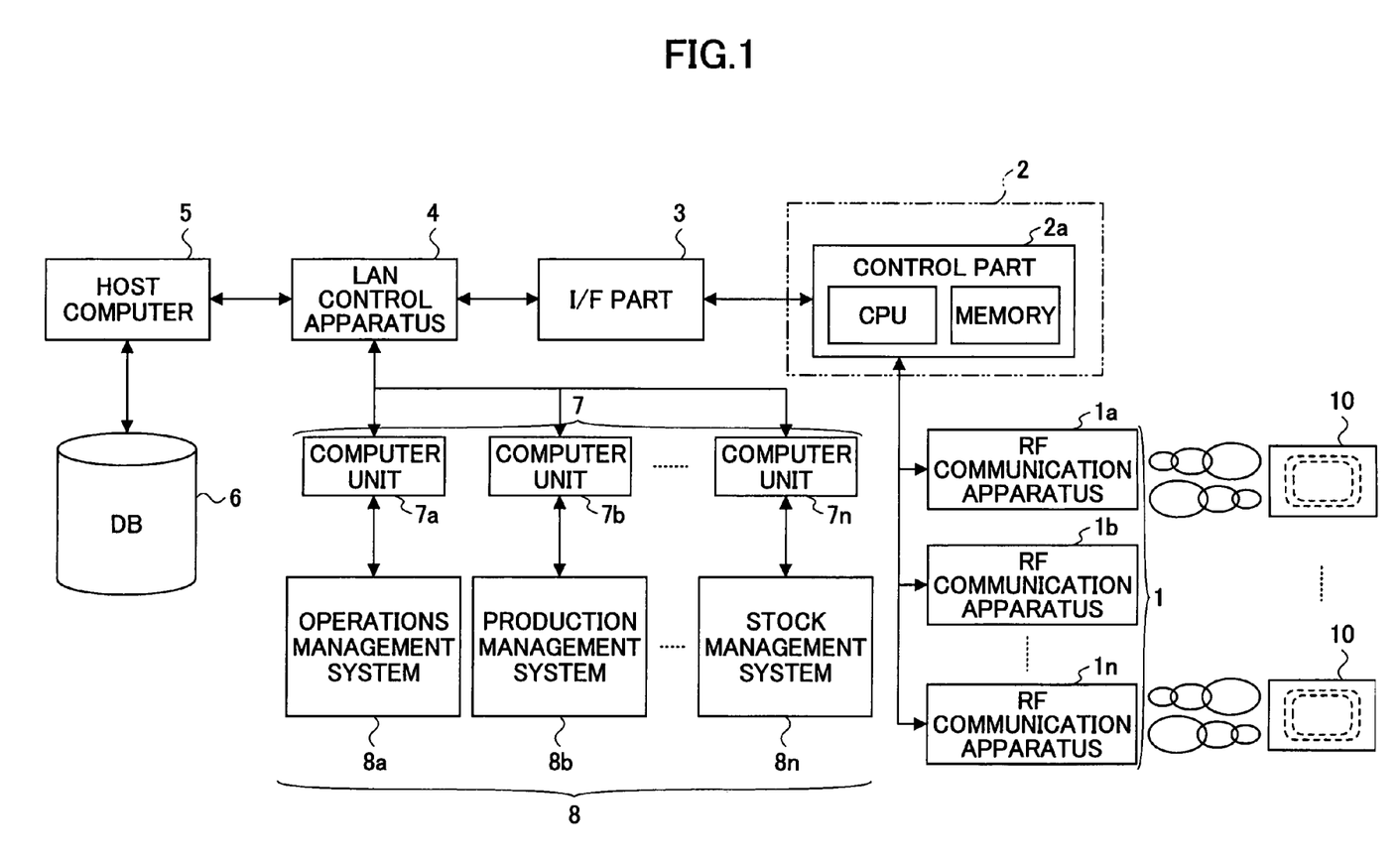
FIG. 1 is a block diagram that schematically illustrates an exemplary configuration of an entire transportation management system according to an embodiment of the present invention.

FIG. 1 is a block diagram which schematically illustrates an example of an entire configuration of a transportation management system according to an embodiment of the present invention. In FIG. 1, reference numeral 1 (1a-1n) indicate a RF (Radio Frequency) communication apparatus, reference numeral 2 indicates a control apparatus disposed in the vicinity of a predetermined area at which the target object is transported (e.g. transport entrance, gate), reference numeral 3 indicates an interface (I/F) part, reference numeral 4 indicates a LAN control apparatus, reference numeral 5 indicates a host computer, reference numeral 6 indicates a database (DB) storing operational information regarding the operation to be performed on a target object and operator information regarding the operator assigned to the operation, reference numeral 7 (7a-7n) indicates a computer unit (computing apparatus) provided for each operation for managing the corresponding operation, reference numeral 8 (8a-8n) indicate an upper level system, and reference numeral 10 indicates an information storage medium (resonant tag). The control apparatus 2 includes a control part 2a provided with a CPU and a memory. An operations management system 8a, a production management system 8b, . . . , and a stock management system 8n are connected to serve as the upper level systems 8a-8n according to the embodiment of the present invention. The computer units 7a-7n are provided with, for example, a CPU (not shown) and a memory apparatus. The computer units 7a-7n include, for example, a personal computer (PC) or a microcomputer unit with a simpler configuration.

In the transportation management system according to the embodiment of the present invention, the RF communication apparatuses 1a-1n perform a process such as reading/writing data from/to the information storage medium 10 in accordance with the control of the control part 2a. The RF communication apparatuses 1a-1n may alternatively have the control apparatus 2 (control part 2a) and the I/F part 3 installed therein. The control part 2a, which is connected to the host computer 5 and the computer units 7a-7n via the I/F part 3 and the LAN control apparatus 4, transmits/receives data stored in the information storage medium 10 with the RF communication apparatuses 1a-1n.

The host computer 5 has the DB 6 connected thereto or installed therein. In addition to the operational information regarding the operation to be performed on the target object and the operator information regarding the operator assigned to the operation, the DB 6 is also loaded (stored) with, for example, information regarding the target object, various data used by the operations management system 8a, the production management system 8b, or the stock management system 8n. The information and data are stored in correspondence with the items set in the fields of the DB 6.

The computer units 7a-7n, which are connected to the operations management system 8a, the production management system 8b, and/or the transportation management system 8n, provide instructions regarding the operations of each system based on reception data received from the RF communication apparatuses 1a-1n. For example, in a case where there is a change in the schedule of an anticipated transport (shipment) (i.e. a shipment earlier or later than anticipated), the change is communicated to the operator of a subsequent operation or is reflected in the schedule. Thereby, the line of the operations can be controlled consistently.

Thus, in the transportation management system according to this embodiment of the present invention, the RF communication apparatus 1 (1a-1n), upon transportation of a target object, transmits a radio wave to the information storage medium 10 attached to the target object. In response to the transmitted radio wave, the information storage medium 10 transmits a radio wave including identification information regarding the target object (i.e. identification information) such as ID information corresponding to the target object. When a target object is transported, the control apparatus 2 obtains information regarding transportation of the target object (i.e. transportation information) such as information regarding the gate to which the target object is transported and/or information regarding the time and date when the target object is transported, and stores the transportation information in its memory. Furthermore, the control apparatus 2 extracts (retrieves) operational information corresponding to the identification information of the target object from the DB 6, and compares the transportation information (indicating the actual results of the transportation) with the operational information (indicating the anticipated results of the transportation). For example, in the comparison, the control apparatus 2 determines changes or abnormality of the transportation (e.g. whether there is a delay/advance in schedule, whether there is any unconfirmed transportation). The control apparatus 2, in accordance with the comparison, instructs notification information (including at least the results of the comparison) be transmitted to the operator of a corresponding operation of the target object.

Figure 2:
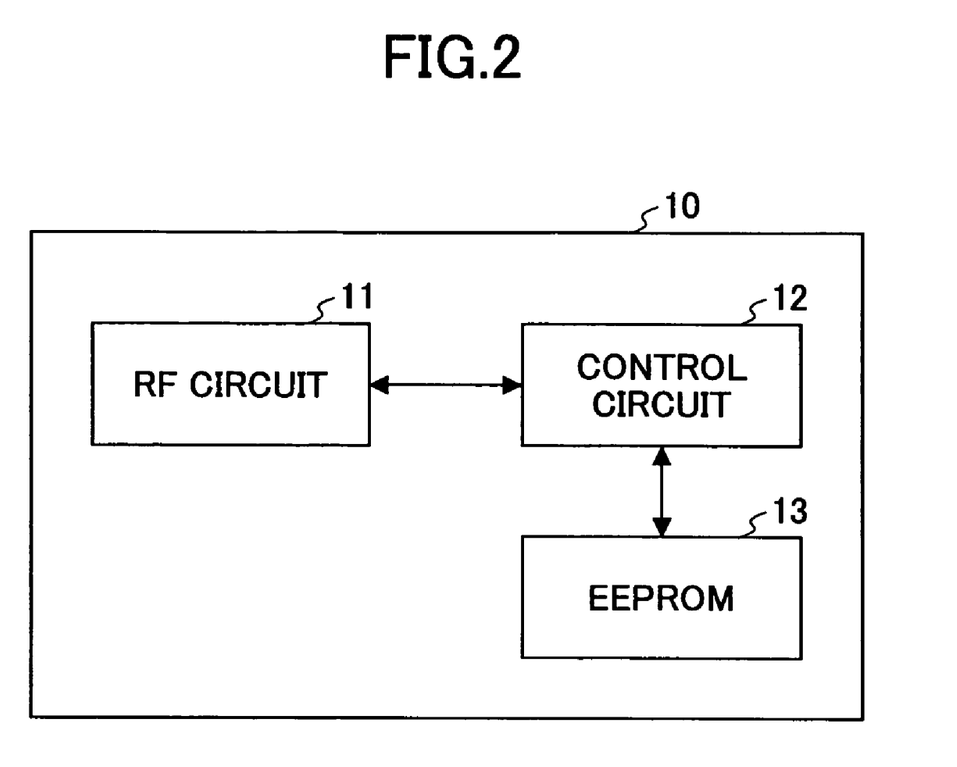
FIG. 2 is a block diagram that schematically illustrates an exemplary configuration of an information storage medium (resonant tag) according to an embodiment of the present invention.

FIG. 2 is a block diagram which schematically illustrates an exemplary configuration of the information storage medium (resonant tag) 10. The information storage medium 10 includes an RF circuit 11, a control circuit 12, and an EEPROM 13. The information storage medium 10 is, for example, a small-sized storage medium for storing data therein, such as an RF-ID element. Here, RF-ID is an abbreviation of Radio Frequency Identification.

The RF circuit 11 and the EEPROM 13 are connected to the control circuit 12. The RF circuit 11 is an analog circuit for receiving radio waves from the RF communication apparatus 1 (1a-1n) shown in FIG. 1. The control circuit 12 is a digital circuit for conducting data processing (e.g. modulation, demodulation) via the RF circuit 11. The EEPROM 13 has identification information (e.g. ID codes for identifying the target object (target article)) stored therein.

Figure 3:
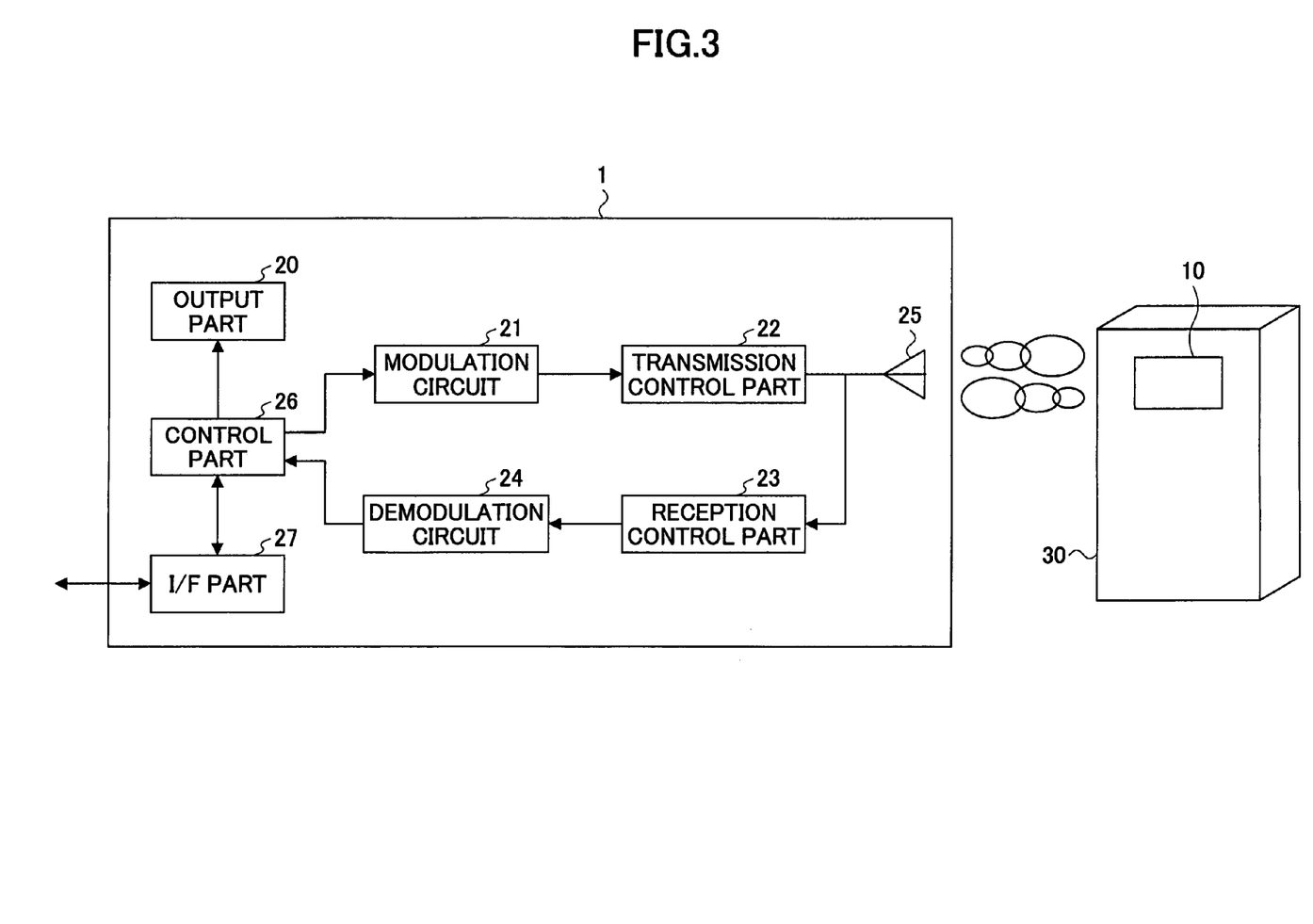
FIG. 3 is a block diagram that schematically illustrates an exemplary configuration of an RF communication apparatus.

FIG. 3 is a block diagram which schematically illustrates an exemplary configuration of the RF communication apparatus 1 (1a-1n). The RF communication apparatus 1 (1a-1n) includes, for example, an output part 20, a modulation circuit 21, a transmission control part 22, a reception control part 23, a demodulation circuit 24, a communication antenna 25, a control part 26, and an I/F part 27. The RF communication apparatus 1 exchanges data with the information storage medium 10 attached to a target object 30. The I/F 27 is provided for communicating with the host computer 5 and the LAN control apparatus 4. The control part 26 is provided for storing transmission/reception data, controlling transmission/reception of radio waves with respect to the information storage medium 10, and for controlling the output part 20. The output part 20 is provided for outputting light signals or sound signals indicative of the operating state of the RF communication apparatus 1 in accordance with the control of the control part 26. The modulation circuit 21 is provided for performing a predetermined modulation process on transmission data including data which is to be transmitted to the information storage medium 10. The transmission control part 22 is provided for transmitting modulated wave (modulated data) to the information storage medium 10. The reception control part 23 is provided for receiving reception data from the information storage medium 10 in response to the transmitted modulated wave (i.e. RF response). The demodulation circuit 24 is provided for performing a predetermined demodulation process on a modulated wave received from the information storage medium 10. The communication antenna 25 is provided for enabling data (radio wave) transmission/reception of the transmission control part 22/reception control part 23 with respect to the information storage medium 10.

The RF communication apparatus 1 according to this embodiment of the present invention has the control apparatus 2 (control part 2a) and the I/F part 3 installed therein. By installing the control apparatus 2 (control part 2a) and the I/F part 3 in the RF communication apparatus 1, data communications can be achieved between the information storage medium 10 and the host computer 5. Accordingly, the RF communication apparatus 1 according to this embodiment of the present invention functions as the control apparatus 2. That is, when the target object 30 is transported, the control part 26 obtains transportation information (e.g. information regarding the gate to which the target object is transported and/or information regarding the time and date when the target object is transported) and stores the transportation information in its memory (not shown). Furthermore, the control part 26 or the control part 2a extracts operational information corresponding to the identification information of the target object 30 from the DB 6, and compares the transportation information (indicating the actual results of the transportation) with the operational information (indicating the anticipated results of the transportation). For example, in the comparison, the control apparatus 2 determines changes or abnormality of the transportation (e.g. whether there is a delay/advance in schedule, whether there is any unconfirmed transportation). The control apparatus 2, in accordance with the comparison, instructs that notification information (including at least the results of the comparison) be transmitted to the operator of a corresponding operation.

Figure 4:
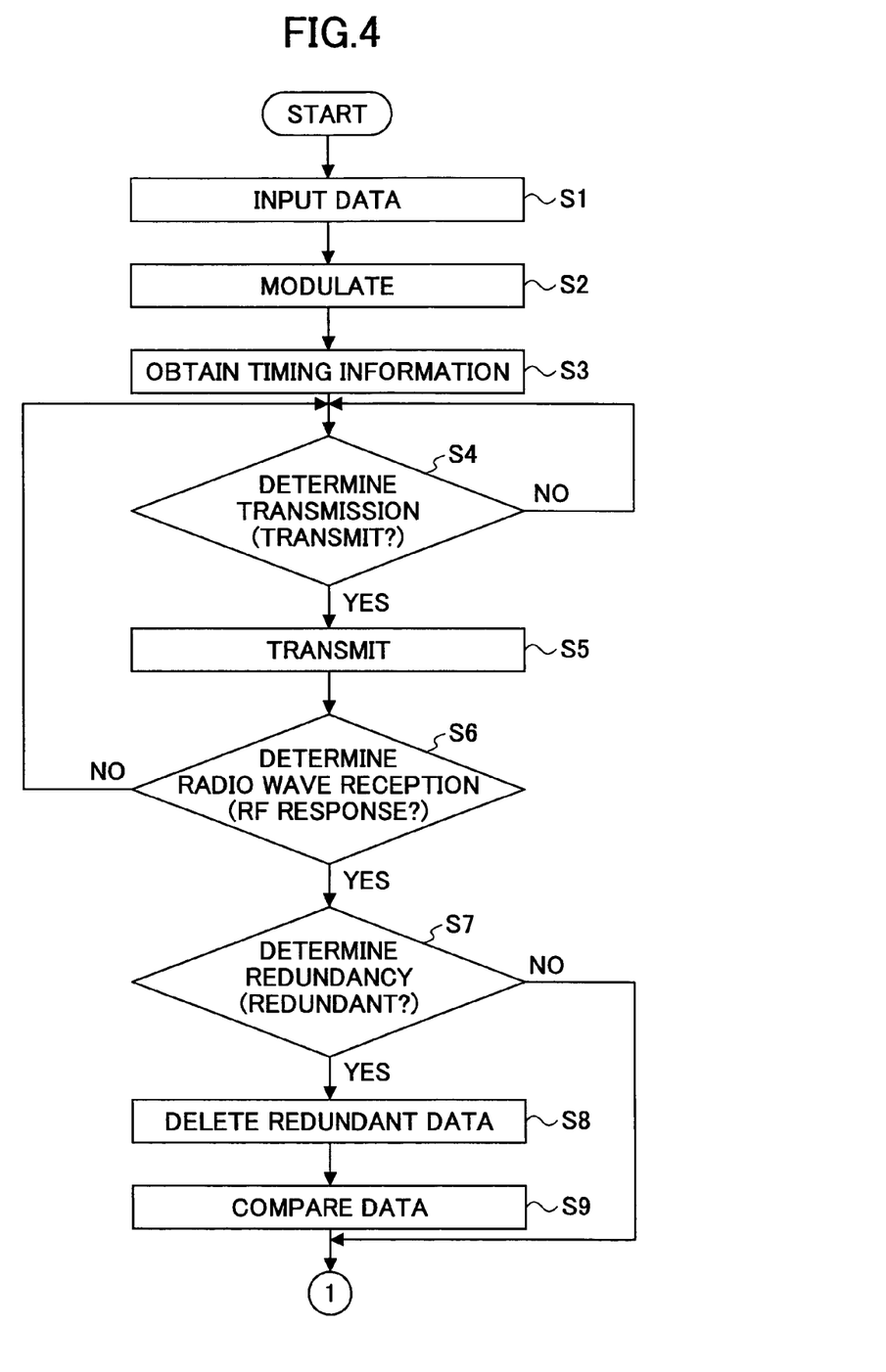
FIG. 4 is a flowchart for describing an example of a transportation management method according to an embodiment of the present invention.
Figure 5:
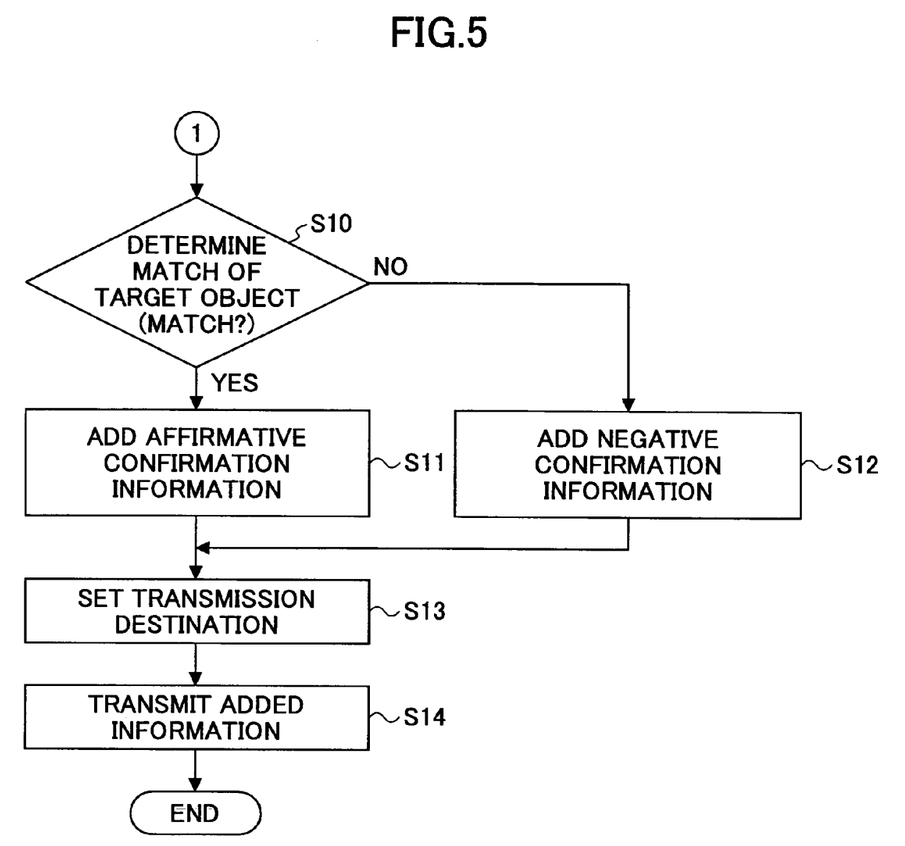
FIG. 5 is a flowchart continuing from FIG. 4 for describing the example of the transportation management method according to the embodiment of the present invention.

FIGS. 4 and 5 are flowchart for describing an example of a transportation management method according to an embodiment of the present invention (FIG. 5 is a continuation of the flow chart shown in FIG. 4). The example below describes an identification process conducted when multiple target objects 30(each attached with the information storage medium 10) are transported in the vicinity of the RF communication apparatus 1 based on the configuration shown in FIGS. 1 and 2.

In FIG. 4, the host computer 5 extracts setting information regarding the identification process (e.g. information regarding the target object 30, transportation information, schedule information) from a corresponding information field in the DB 6, and transmits the extracted information to the control apparatus 2 via the LAN control apparatus 4 and the I/F 3.

More specifically, the host computer 5 extracts setting information regarding transportation (e.g. size/width of the gate to which the target object 30 is to be transported, shape of the target object 30, the amount of target objects, the frequency (repetition) of the transportation) and transmits the extracted setting information to the control part 2a of the control apparatus 2 for controlling the gate corresponding to the target object 30. The control part 2a of the control apparatus 2, receiving the setting information (setting data) from the host computer 5 via the LAN control apparatus 4 and the I/F part 3, inputs (stores) the setting data in its memory (Step S1).

The control part 2a instructs the modulation circuit 21 of the RF communication apparatus 1 (1a-1n) to conduct a modulation process in accordance with the setting information stored in its memory for generating transmission radio waves corresponding to the RF communication apparatus 1 (1a-1n) (Step S2). Then, the transmission control part 22 obtains timing information (e.g. time difference transmission of radio waves with same frequency, time difference/synchronous transmission of multiple radio waves) included in the setting information stored in the memory of the control part 2a (Step S3). Then, the transmission control part 22 determines whether to transmit transmission radio waves in accordance with the obtained timing information (Step S4).

In a case where the transmission control part 22 determines to transmit transmission radio waves (YES in Step S4), the transmission control part 22 transmits the transmission radio waves (which are modulated in the modulation circuit 21) at the transmission timing obtained in Step S3 to the information storage medium 10 via the antenna 25 (Step S5). In a case where the transmission control part 22 determines not to transmit transmission radio waves (NO in Step S4), the RF communication apparatus 1 waits until the appropriate transmission timing (Step S4). It is to be noted that the control part 2a, which is connected to one or more RF communication apparatuses 1a-1n, performs an exclusive process and/or a synchronous process for the transmission of the transmission radio waves in accordance with the setting information stored in the memory of the control part 2a.

Next, the reception control part 23 determines whether a reception radio wave (modulated data signal) is received from the information storage medium 10 via the antenna 25 (Step S6). In a case where the reception control part 23 determines reception of the reception radio wave (YES in Step S6), the demodulation circuit 24 performs a demodulation process on the received reception radio wave. In a case where the reception control part 23 determines no reception of the reception radio wave (NO in Step S6), the process returns to Step S4. Then, the transmission control part 22 determines whether to transmit transmission radio waves again.

Next, the control part 2a stores the demodulated reception data (obtained from the demodulation process) in its memory and determines whether there is any redundant data with respect to data received from other RF communication apparatuses (1a-1n) (Step S7). In a case where the control part 2a determines that there is redundant reception data (YES in Step S7), the control part 2a deletes the redundant reception data (Step S8). In a case where the control part 2a determines that there is no redundant reception data (NO in Step S7), the control part 2a compares the reception data with the data stored its memory (Step S9).

Then, the control part 2a determines whether the reception data matches the data of a target object anticipated for transportation according to the comparison in Step S9 (Step S10).

In a case where the control part 2a determines that the reception data matches data of the anticipated target object (YES in Step S10), the control part 2a adds affirmative confirmation information (e.g. gate information, information regarding the RF communication apparatus 1, operational information regarding the antenna, information regarding date/time of transportation) to the reception data (Step S11), so that the affirmative confirmation information may be written onto the memory of the information storage medium 10. In a case where the control part 2a determines that the reception data does not match data of the anticipated target object (NO in Step S10), the control part 2a, assuming that the transportation is an error, adds negative confirmation information to the reception data based on information similar to or corresponding to the anticipated target object (Step S12). The control part 2a, depending on whether the added information is affirmative confirmation information or negative confirmation information, extracts corresponding transmission destination information and/or corresponding operational information from the DB6 and sets a transmission destination according to the extracted information (Step S13).

Then, the control part 2a transmits the demodulated reception data (added with the affirmative confirmation information or the negative confirmation information) to the transmission destination. Thus, the transmitted data is stored in the DB 6 of the host computer 5, so that the data is applied to the upper level system 8 (operations management system 8a, production management system 8b, stock management system 8n) which are controlled by the computer unit 7 (7a-7n).

The output of the output part 20 of the RF communication apparatus 1 may be indicated by using, for example, an LED. For example, the LED may be used to indicate the operating state (a blue type light indicating an active state and a red type light indicating an inactive state) or to communicate the results of the identification. Alternatively, the output of the output part 20 of the RF communication apparatus 1 may be indicated by using, for example, sound or voice. For example, sound may be used to indicate the operation (short sound indicating an active state and a continuous sound indicating an inactive state) or to signal the results of the identification. Furthermore, a camera (not shown) may be placed in the vicinity of the gate for performing image identification on the target object passing through the gate, to thereby prevent the information storage medium 10 from passing the RF communication apparatus 1 without being identified.

Although the output of the output part 20 of the RF communication apparatus 1 is described above as being indicated with LED, sound or voice, other methods may also be employed. For example, a display board (not shown) may be employed for displaying demodulated data of the information storage medium 10 or other related information.

Figure 6:
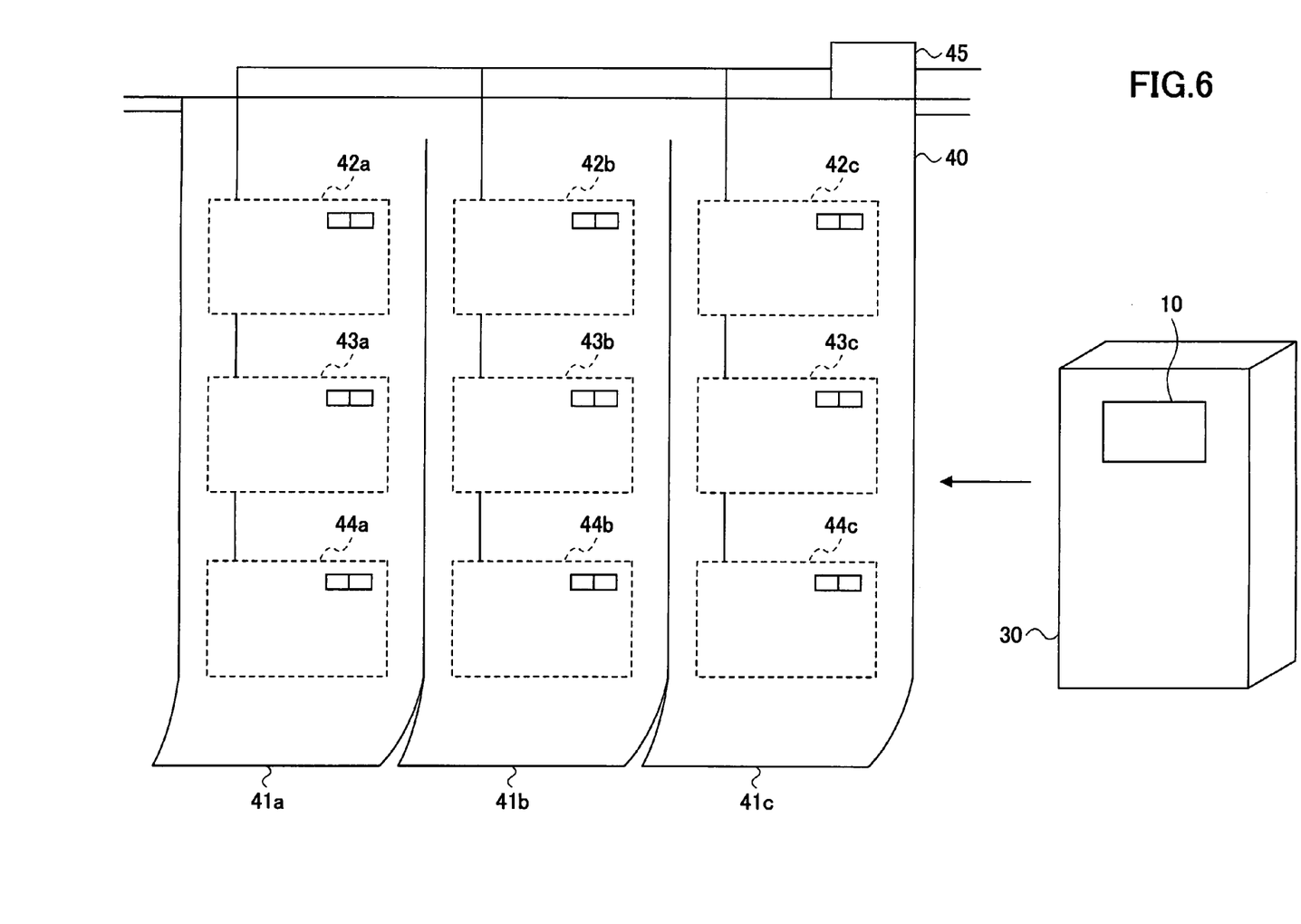
FIG. 6 is a schematic drawing showing an example of a split curtain-like sheet member provided at a gate according to an embodiment of the present invention.

FIG. 6 is a drawing showing a split curtain-like sheet member 40 provided at a gate where the target object 30 is transported. The split curtain-like sheet member 40 includes a control part 45, and pouch parts 42a-44c provided in rows 41a-41c. The pouch parts 42a-44c are provided for having the RF communication apparatuses 1a-1n disposed therein. The RF communication apparatuses 1a-1n may be taken in and out of the pouch parts 42a-44c. Accordingly, identification of the information storage medium 10 attached to the target object 30 may be achieved by passing the target object 30 through the split curtain-like sheet member 40. In this example, a control part 45 performs an exclusive process and/or a synchronous process by controlling the RF communication apparatuses 1 (1a-1n) disposed inside the pouch parts 42a-44c in the rows 41a-41c of the split curtain-like sheet member 40. Each of the pouch parts 42a-44c has a configuration similar to that of a bag, and includes the RF communication apparatus 1 (1a-1n) therein. Accordingly, in a case where, for example, one of the RF communication apparatuses 1 (1a-1n) cannot properly perform the identification process due to, for example, disconnection or malfunction, the defective RF communication apparatus 1 can be removed for replacement.

It is to be noted that the present invention is not limited to the split curtain-like sheet member 40 provided with multiple pouch parts 42a-44c. Other embodiments may be employed, as long as it is a sheet member that allows the RF communication apparatus 1 to be detachably attached thereto, and sway (oscillate) when the target object contacts the sheet member being, for example, in a hung state (drooped state).

Figure 7:
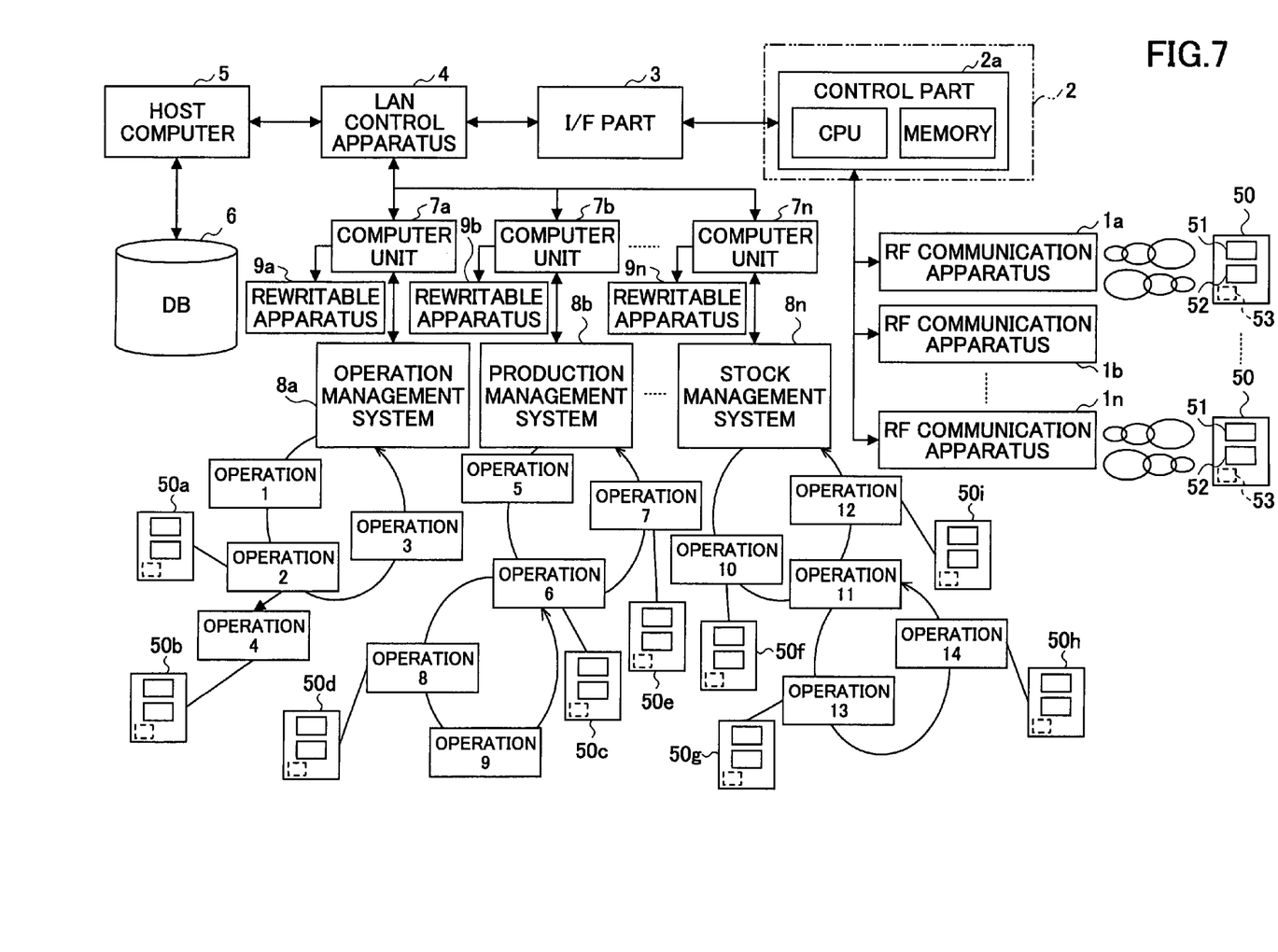
FIG. 7 is a block diagram that schematically illustrates an exemplary configuration of an entire transportation management system according to another embodiment of the present invention.

FIG. 7 is a block diagram which schematically illustrates an example of an entire configuration of a transportation management system according to another embodiment of the present invention. In FIG. 7, reference numerals 1a-1n indicate the RF communication apparatuses, reference numeral 2 indicates the control apparatus disposed in the vicinity of the transport entrance (gate), reference numeral 3 indicates the interface (I/F) part, reference numeral 4 indicates the LAN control apparatus, reference numeral 5 indicates the host computer, reference numeral 6 indicates the database (DB) storing operational information regarding the operation to be performed on a target object and operator information regarding the operator assigned to the operation, reference numerals 7a-7n indicate the computer units (e.g. PC, microcomputer unit) provided to each operation for managing the corresponding operation, reference numerals 8a-8n indicate the upper level system, reference numerals 9a-9n indicate rewritable apparatuses connected to the computer units 7a-7n, and reference numeral 50 (50a-50i) indicates an information storage medium. The control apparatus 2 includes a control part 2a provided with a CPU and a memory.

The same as FIG. 1, an operations management system 8a, a production management system 8b, . . . , and a stock management system 8n are connected to serve as the upper level systems 8a-8n according to this embodiment of the present invention. The operations management system 8a includes operations 1-4 as its lower level operations. The production management system 8b includes operations 5-9 as its lower level operations. The stock management system 8n includes operations 10-14 as its lower level operations. A computer unit (not shown) and a rewritable apparatus (not shown) are provided to each of the lower level operations (operations 1-14). It is to be noted that, in this embodiment, like components are denoted with like reference numerals as of FIG. 1 and are not further described.

The information storage medium 50 according to this embodiment of the present invention includes a first display area 51, a second display area 52, and a memory area 53. The first display area 51 or the second display area 52 may be, for example, rewritable paper that is attached to the target object and used by being passed around by an operator or a manager in each of the operations. The first display area 51 and/or the second display area 52 are areas which visibly display information regarding the operation of the target object. The information that is to be displayed on the first/second display areas 51, 52 can be rewritten. Meanwhile, the same as the configuration shown in FIG. 2, the memory area 53 is an RF-ID element including, for example, an RF circuit (not shown), a control circuit (not shown), and an EEPROM (not shown). The memory area 53 allows various data to be stored therein.

In the memory area 53, the RF circuit and the EEPROM are connected to the control circuit. The RF circuit is an analog circuit for receiving radio waves from the RF communication apparatuses 1a-1n shown in FIG. 7. The control circuit is a digital circuit for conducting data processing (e.g. modulation, demodulation) via the RF circuit. The EEPROM has identification information (e.g. ID codes for identifying the target object (target article)) stored therein.

The rewritable apparatuses 9a-9n and the rewritable apparatuses (not shown) provided to the lower level operations (operation 1-14) are, for example, printers for rewriting the information in the first display area 51 and the second display area 52 of the information storage medium 50. The printing/erasing of information to/from the first display area 51 and the second display area 52 can be performed with a rewriting technology using, for example, light or heat. When the information storage medium 50 is placed on a sheet feeding tray of the rewritable apparatus, the rewritable apparatus determines whether the information storage medium 50 is placed on a sheet feeding tray by using a sensor disposed in the vicinity of the sheet feeding tray and receives data from the memory area 53 of the information storage medium 50 by using an antenna that is disposed, for example, on the back side of the sheet feeding tray. Then, the information storage medium 50 is fed from the sheet feeding tray of the rewritable apparatus and is discharged after having the information of the first display area 51 and/or the second display area rewritten.

Figure 8A:
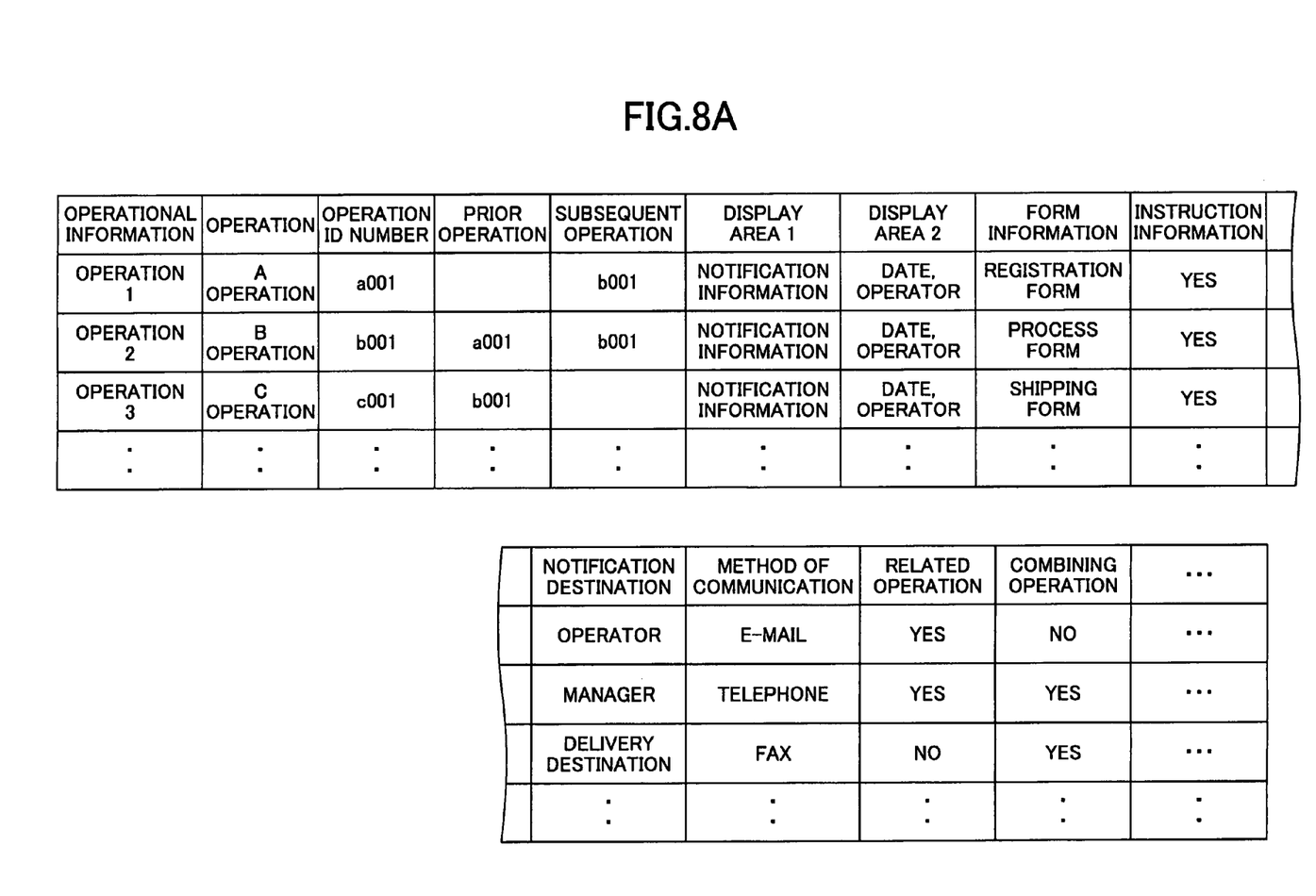
FIGS. 8A and 8B are tables indicative of operational management information and display area management information stored in a memory of a control part or a database according to an embodiment of the present invention.
Figure 8B:
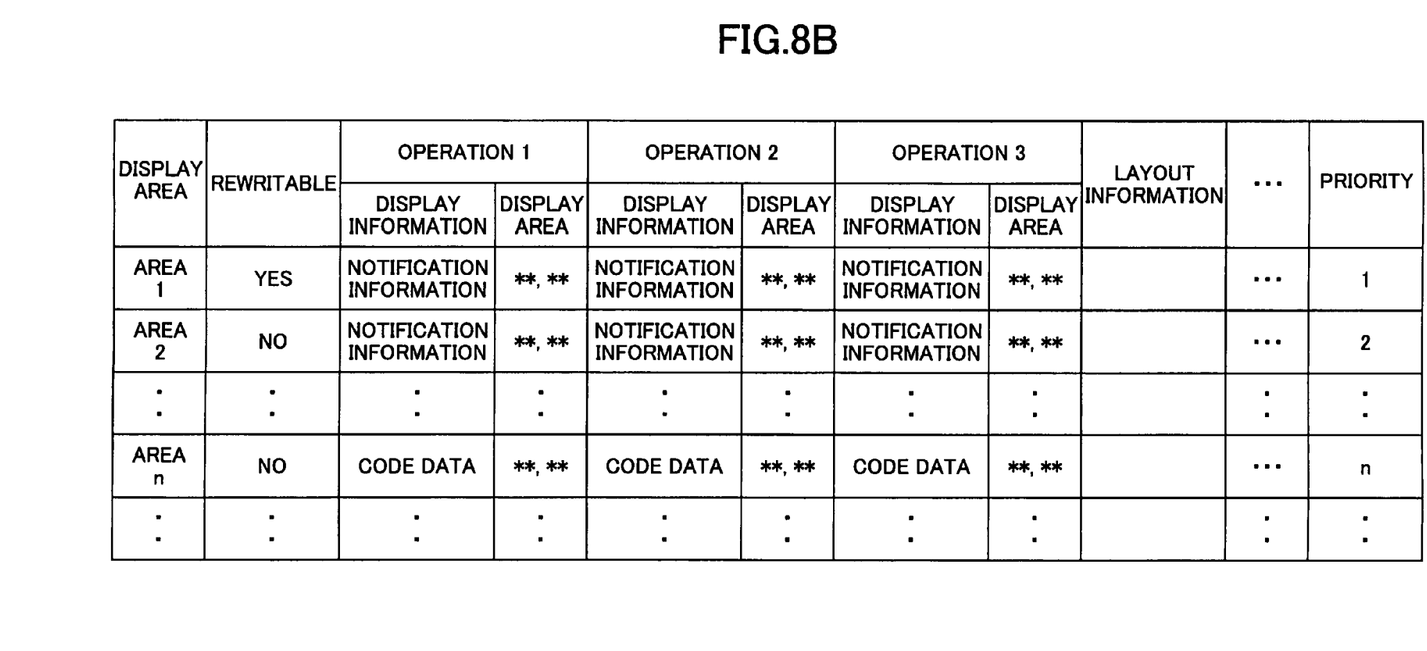

FIGS. 8A and 8B are tables indicative of operations management information and display area management information stored in the memory of the control part 2a or the DB 6. FIG. 8A shows an example of an operations management information table used for managing each operation. With the operations management information table, characteristic information (property information) is managed in correspondence with each form (each document) printed (output) for each operation. FIG. 8B shows an example of a display area management table used for managing each display area of the information storage medium 50. Each rewritable apparatus rewrites information on the display area (the first display area 51 and/or the second display area 52) of the information storage medium 50 in accordance with the operations management information table and the display area management table.

In FIG. 8A, the operations management table is loaded with information regarding operations management for each operation. Such information includes, for example, component registration information, process instruction information, and shipping information. The operations management information includes various information items corresponding to each operation (in this example, Operation 1, Operation 2, and Operation 3), for example, subject of the operation (e.g. A Operation, B Operation, C Operation), operation identification (ID) information (e.g. a001, b001, c001), information to be displayed in the first display area 51 and the second display area 52 (e.g. displaying in the first display area 51 information such as notification information including the comparison results between the actual results and the anticipated results of transportation, displaying in the second display area 52 information such as date information or operator information), and the numbers corresponding to each of the rewritable apparatuses.

Furthermore, the characteristic information (property information) of the operations management information table includes various information items corresponding to the type of form (document) used for printing (outputting) information thereto (in this example, registration form, process form, shipping form). For example, the characteristic information (property information) may include instruction information (information on whether there are any instructions), notification destination information (e.g. operator, manager, delivery destination), method of communication (electronic mail, telephone, facsimile) related operational information (information on whether there are any related operations), and combining information (information on whether there are any operations to combine). In a case where multiple operations are to be combined in a subsequent operation (i.e. a case where there is a combining operation in which multiple components are assembled for producing a new single component (product)), multiple forms (information recording media) corresponding to the operations of the components are combined into a single information storage medium 50. The necessity of combining the operations can be determined by the characteristic information "combining operation" included in the operations management table of FIG. 8A. In this example, the process form and the shipping form are to be combined.

In FIG. 8B, the display area management table is loaded (recorded) with management information regarding the display area in correspondence with each display area. For example, the information may include rewrite control information (information indicating whether rewriting is possible) and layout information. The rewrite control information is used for controlling the rewriting on the display areas. This example shows that the first display area (i.e. Area 1) is rewritable and that the second display area 52 is not rewritable. The rewriting of information in the rewritable area and un-rewritable area may be controlled by using software.

Furthermore, the layout information includes, for example, number of areas (spaces) displayed in the display area, position for display, and/or the area of the display. For example, notification information may be rewritten in accordance with the layout information. For example, the layout information may be changed in accordance with the amount of information (e.g. notification information) which is to be displayed as visible information. The visible information to be displayed may include, for example, letters (e.g. alphabet letters), numerals, symbols, and codes. The visible information is printed out (output) by the rewritable apparatus.

In FIG. 7, when the target object is transported, the control apparatus 2 obtains transportation information (e.g. information regarding the gate to which the target object is transported and/or information regarding the time and date when the target object is transported) and stores the transportation information in its memory. Furthermore, the control apparatus 2 extracts operational information corresponding to the identification information of the target object from the DB 6, and compares the transportation information (indicating the actual results of the transportation) with the operational information (indicating the anticipated results of the transportation). For example, in the comparison, the control apparatus 2 determines changes or abnormality of the transportation (e.g. whether there is a delay/advance in schedule, whether there is any unconfirmed transportation). The control apparatus 2, in accordance with the comparison, instructs that notification information (including at least the results of the comparison) be transmitted to the operator of the corresponding operation. The computer unit (not shown) corresponding to the operation instructs the rewritable apparatus (not shown) to rewrite the information of the first display area 51 and/or the second display area 52 of the information storage medium 50 based on the notification information. Then, the rewritable apparatus (not shown) rewrites the information of the first display area 51 and/or the second display area 52 of the information storage medium 50 in compliance with the instruction from the computer unit (not shown).

In a more specific example, a computer unit (not shown) provided to "Operation 2" of the operations management system 8a determines whether to assign a new information storage medium 50b with respect to another "Operation 4" in accordance with the progress of "Operation 2". When the computer unit (not shown) provided to "Operation 2" determines to assign a new information storage medium 50b, the computer unit (not shown) provided to "Operation 2" transmits the results of the determination to the computer unit (not shown) provided to "Operation 4". The computer unit (not shown) provided to "Operation 4" instructs its corresponding rewritable apparatus (not shown) to rewrite data of the information storage medium 50a of "Operation 2" to a new information storage medium 50b. The rewritable apparatus (not shown) rewrites the first display area 51 or the second display area 52 in compliance with the instruction from the computer unit (not shown) provided to "Operation 4".

Furthermore, a computer unit (not shown) provided to "Operation 6" of the production management system 8b determines whether to assign a new information storage medium 50d with respect to another "Operation 8" in accordance with the progress of "Operation 6". When the computer unit (not shown) provided to "Operation 6" determines to assign a new information storage medium 50d, the computer unit (not shown) provided to "Operation 6" transmits the results of the determination to the computer unit (not shown) provided to "Operation 8". The computer unit (not shown) provided to "Operation 8" instructs its corresponding rewritable apparatus (not shown) to rewrite the data of information storage medium 50c of "Operation 6" to a new information storage medium 50d. The rewritable apparatus (not shown) rewrites the first display area 51 or the second display area 52 in compliance with the instruction from the computer unit (not shown) provided to "Operation 8". Alternatively, in "Operation 7", a new information storage medium 50e may be assigned by combining the information storage medium 50c of "Operation 6" and the information storage medium 50d of "Operation 8".

Furthermore, a computer unit (not shown) provided to "Operation 7" determines whether to assign a new information storage medium 50f with respect to another "Operation 10" of the stock management system 8n in accordance with the progress of "Operation 7". When the computer unit (not shown) provided to "Operation 7" determines to issue a new information storage medium 50f, the computer unit (not shown) provided to "Operation 7" transmits the results of the determination to the computer unit (not shown) provided to "Operation 10". The computer unit (not shown) provided to "Operation 10" instructs its corresponding rewritable apparatus (not shown) to rewrite the data of the information storage medium 50e of "Operation 7" to a new information storage medium 50f. The rewritable apparatus (not shown) rewrites the first display area 51 or the second display area 52 in compliance with the instruction from the computer unit (not shown) provided to "Operation 10". In the same manner, a series of rewriting procedures are conducted from "Operation 11" to "Operation 13" (information storage medium 50g), "Operation 14" (information storage medium 50h, and "Operation 12" (information storage medium 50i).

Further, the present invention is not limited to these embodiments, but various variations and modifications may be made without departing from the scope of the present invention.

The present application is based on Japanese Priority Application Nos. 2003-317024 and 2004-261012 filed on Sep. 9, 2003 and Sep. 8, 2004, respectively with the Japanese Patent Office, the entire contents of which are hereby incorporated by reference.

What is claimed is:

1. A transportation management system for managing transportation of a target object with an attached information storage medium, the transportation management system comprising:
   a database including operational information and operator information that correspond to the target object, the operational information including an anticipated result of the transportation of the target object;
   a communication apparatus including
      a transmission control part configured to transmit a transmission radio wave to the information storage medium attached to the target object, and
      a reception control part configured to receive a reception radio wave, including identification information of the target object, from the information storage medium in response to the transmitted transmission radio wave;
   a transport information obtaining part configured to obtain transport information of the target object when the target object is transported to a predetermined area, the transport information including an actual result of the transportation of the target object;
   an operational information retrieving part configured to retrieve the operational information from the database in accordance with the identification information of the target object;
   an information comparing part configured to determine a delay or advance in schedule of the transportation of the target object by comparing the actual result in the transport information and the anticipated result in the operational information;
   a notification information generating part configured to generate notification information indicative of a result of the comparison; and
   a notification information transmitting part configured to transmit the notification information to a predetermined destination in accordance with the operator information.

2. A transportation management system for managing transportation of a target object with an attached information storage medium, the transportation management system comprising:
   a database including operational information and operator information that correspond to the target object, the operational information including an anticipated result of the transportation of the target object;
   a communication apparatus including
      a transmission control part configured to transmit a transmission radio wave to the information storage medium attached to the target object, and
      a reception control part configured to receive a reception radio wave, including identification information of the target object, from the information storage medium in response to the transmitted transmission radio wave;
   a transport information obtaining part configured to obtain transport information of the target object when the target object is transported to a predetermined area, the transport information including an actual result of the transportation of the target object;
   an operational information retrieving part configured to retrieve the operational information from the database in accordance with the identification information of the target object;
   an information comparing part configured to determine a delay or advance in schedule of the transportation of the target object by comparing the actual result in the transport information and the anticipated result in the operational information;
   a notification information generating part configured to generate notification information indicative of a result of the comparison; and
   a notification information transmitting part configured to transmit the notification information to a predetermined destination in accordance with the operator information,
   wherein the communication apparatus is detachably attached to a sheet member, and the sheet member is configured to sway when the target object contacts the sheet member.

3. The transportation management system as claimed in claim 2, wherein the sheet member is shaped as a split curtain, and the sheet member includes a pouch part that is configured to removably install the communication apparatus therein.

4. A communication sheet, comprising:
   the communication apparatus and the sheet member of claim 2.

5. A transportation management system for managing transportation of a target object with an attached information storage medium including a rewritable display area that displays visible information, the transportation management system comprising:
- a database including operational information and operator information that correspond to the target object;
- a communication apparatus including
  - a transmission control part configured to transmit a transmission radio wave to the information storage medium attached to the target object, and
  - a reception control part configured to receive a reception radio wave, including identification information of the target object, from the information storage medium in response to the transmitted transmission radio wave;
- a transport information obtaining part configured to obtain transport information of the target object when the target object is transported to a predetermined area;
- an operational information retrieving part configured to retrieve the operational information corresponding to the target object from the database in accordance with the identification information of the target object;
- an information comparing part configured to compare the transport information of the target object and the operational information corresponding to the target object;
- a notification information generating part configured to generate notification information indicative of a result of the comparison;
- a notification information transmitting part configured to transmit the notification information;
- a rewriting apparatus configured to rewrite the visible information displayed in the rewritable display area of the information storage medium; and
- a computing apparatus configured to instruct the rewriting apparatus that the visible information be displayed in the rewritable display area of the information storage medium in accordance with the notification information transmitted from the notification information transmitting part.

6. A transportation management apparatus for managing transportation of a target object with an attached information storage medium, the transportation management apparatus comprising:
- a database including operational information and operator information that correspond to the target object, the operational information including an anticipated result of the transportation of the target object;
- a communication part including
  - a transmission control portion configured to transmit a transmission radio wave to the information storage medium attached to the target object, and
  - a reception control portion configured to receive a reception radio wave, including identification information of the target object, from the information storage medium in response to the transmitted transmission radio wave;
- a transport information obtaining portion configured to obtain transport information of the target object when the target object is transported to a predetermined area, the transport information including an actual result of the transportation of the target object;
- an operational information retrieving portion configured to retrieve the operational information from the database in accordance with the identification information of the target object;
- an information comparing portion configured to determine delay or advance in schedule of the transportation of the target object by comparing compare the actual result in the transport information of the target object and the anticipated result in the operational information corresponding to the target object;
- a notification information generating portion configured to generate notification information indicative of a result of the comparison; and
- a notification information transmitting portion configured to transmit the notification information to a predetermined destination in accordance with the operator information.

7. A transportation management method for managing transportation of a target object with an attached information storage medium, the method comprising:
- storing operational information and operator information that correspond to the target object in a database, the operational information including an anticipated result of the transportation of the target object;
- transmitting a transmission radio wave to the information storage medium attached to the target object;
- receiving a reception radio wave, including identification information of the target object, from the information storage medium in response to the transmitted transmission radio wave;
- obtaining transport information of the target object when the target object is transported to a predetermined area, the transport information including an actual result of the transportation of the target object;
- retrieving the operational information from the database in accordance with the identification information of the target object;
- determining a delay or advance in schedule of the transportation of the target object by comparing the actual result in the transport information of the target object and the anticipated result in the operational information corresponding to the target object;
- generating notification information indicative of a result of the determining; and
- transmitting the notification information to a predetermined destination in accordance with the operator information.

8. A transportation management apparatus for managing transportation of a target object with an attached information storage medium, the transportation management apparatus comprising:
- a database including operational information and operator information that correspond to the target object, the operational information including an anticipated result of the transportation of the target object;
- a communication part including
  - a transmission control portion configured to transmit a transmission radio wave to the information storage medium attached to the target object, and
  - a reception control portion configured to receive a reception radio wave, including identification information of the target object, from the information storage medium in response to the transmitted transmission radio wave;
- a transport information obtaining portion configured to obtain transport information of the target object when the target object is transported to a predetermined area, the transport information including an actual result of the transportation of the target object;
- an operational information retrieving portion configured to retrieve the operational information from the database in accordance with the identification information of the target object;

an information comparing portion configured to determine delay or advance in schedule of the transportation of the target object by comparing the actual result in the transport information and the anticipated result in the operational information;

a notification information generating portion configured to generate notification information indicative of a result of the comparison; and a notification information transmitting portion configured to transmit the notification information to a predetermined destination in accordance with the operator information, wherein the communication part is detachably attached to a sheet member, and the sheet member is configured to sway when the target object contacts the sheet member.

9. A transportation management method for managing transportation of a target object with an attached information storage medium, the method comprising:

storing operational information and operator information that correspond to the target object in a database, the operational information including an anticipated result of the transportation of the target object;

transmitting a transmission radio wave to the information storage medium attached to the target object;

receiving a reception radio wave, including identification information of the target object, from the information storage medium in response to the transmitted transmission radio wave;

obtaining transport information of the target object when the target object is transported to a predetermined area, the transport information including an actual result of the transportation of the target object;

retrieving the operational information from the database in accordance with the identification information of the target object;

determining a delay or advance in schedule of the transportation of the target object by comparing the actual result in the transport information and the anticipated result in the operational information;

generating notification information indicative of a result of the determining;

transmitting the notification information to a predetermined destination in accordance with the operator information; and detachably attaching a communication apparatus used in said transmitting of the transmission radio wave and used in said receiving the reception radio wave to a sheet member for allowing the sheet member to sway when the target object contacts the sheet member.

10. A transportation management apparatus for managing transportation of a target object with an attached information storage medium including a rewritable display area that displays visible information, the transportation management apparatus comprising:

a database including operational information and operator information that correspond to the target object;

a communication part including a transmission control portion configured to transmit a transmission radio wave to the information storage medium attached to the target object, and a reception control portion configured to receive a reception radio wave, including identification information of the target object, from the information storage medium in response to the transmitted transmission radio wave;

a transport information obtaining portion configured to obtain transport information of the target object when the target object is transported to a predetermined area;

an operational information retrieving portion configured to receive the operational information corresponding to the target object from the database in accordance with the identification information of the target object;

an information comparing portion configured to compare the transport information of the target object and the operational information corresponding to the target object;

a notification information generating portion configured to generate notification information indicative of the result of the comparison;

a notification information transmitting portion configured to transmit the notification information;

a rewriting apparatus configured to rewrite the visible information displayed in the rewritable display area of the information storage medium; and a computing apparatus configured to instruct the rewriting apparatus that the visible information be displayed in the rewritable display area of the information storage medium in accordance with the notification information transmitted from the notification information transmitting portion.

11. A transportation management method for managing transportation of a target object with an attached information storage medium including a rewritable display area that displays visible information, the method comprising:

storing operational information and operator information that correspond to the target object in a database;

transmitting a transmission radio wave to the information storage medium attached to the target object;

receiving a reception radio wave, including identification information of the target object, from the information storage medium in response to the transmitted transmission radio wave;

obtaining transport information of the target object when the target object is transported to a predetermined area;

receiving the operational information corresponding to the target object from the database in accordance with the identification information of the target object;

comparing the transport information of the target object and the operational information corresponding to the target object;

generating notification information indicative of the result of the comparing;

transmitting the notification information;

rewriting the visible information displayed in the rewritable display area of the information storage medium; and instructing the rewriting apparatus that the visible information be displayed in the rewritable display area of the information storage medium in accordance with the notification information transmitted in the transmitting.

* * * * *